US010896034B2

(12) United States Patent
Vinod

(10) Patent No.: US 10,896,034 B2
(45) Date of Patent: Jan. 19, 2021

(54) METHODS AND SYSTEMS FOR AUTOMATED SCREEN DISPLAY GENERATION AND CONFIGURATION

(71) Applicant: Babu Vinod, Fremont, CA (US)

(72) Inventor: Babu Vinod, Fremont, CA (US)

( * ) Notice: Subject to any disclaimer, the term of this patent is extended or adjusted under 35 U.S.C. 154(b) by 0 days.

(21) Appl. No.: 16/684,577

(22) Filed: Nov. 14, 2019

(65) Prior Publication Data

US 2020/0174776 A1    Jun. 4, 2020

Related U.S. Application Data

(60) Provisional application No. 62/767,152, filed on Nov. 14, 2018.

(51) Int. Cl.
*G06F 8/65* (2018.01)
*G06F 8/34* (2018.01)
*G06N 3/08* (2006.01)
*G06N 20/00* (2019.01)
*G06F 8/38* (2018.01)

(52) U.S. Cl.
CPC ............. *G06F 8/65* (2013.01); *G06F 8/34* (2013.01); *G06F 8/38* (2013.01); *G06N 3/08* (2013.01); *G06N 20/00* (2019.01)

(58) Field of Classification Search
CPC ................................. G06F 8/65; G06N 20/00
USPC ........................................................ 715/744
See application file for complete search history.

(56) References Cited

U.S. PATENT DOCUMENTS

| | | | |
|---|---|---|---|
| 7,092,928 B1* | 8/2006 | Elad | G06N 5/04 |
| | | | 706/60 |
| 7,480,640 B1* | 1/2009 | Elad | G06Q 10/10 |
| | | | 706/14 |
| 10,187,337 B2* | 1/2019 | Smullen | H04L 63/18 |
| 10,303,978 B1* | 5/2019 | Kang | G06N 3/088 |
| 10,460,215 B2* | 10/2019 | Herold | G06K 9/00348 |
| 10,565,634 B2* | 2/2020 | Talmor | G06Q 30/0617 |
| 10,572,801 B2* | 2/2020 | Mars | G06N 3/0454 |
| 10,599,686 B1* | 3/2020 | Busbridge | G06F 16/258 |
| 10,659,403 B2* | 5/2020 | Smullen | H04L 67/02 |
| 10,726,203 B2* | 7/2020 | Zakharov | G06Q 10/20 |
| 10,733,538 B2* | 8/2020 | Singaraju | G06N 3/08 |
| 2008/0163202 A1* | 7/2008 | Kembel | H04L 67/42 |
| | | | 717/178 |
| 2014/0223423 A1* | 8/2014 | Alsina | G06F 8/65 |
| | | | 717/173 |
| 2017/0091651 A1* | 3/2017 | Miao | G06N 20/00 |
| 2017/0212748 A1* | 7/2017 | Agnew | G06F 8/36 |
| 2017/0262275 A1* | 9/2017 | Mohiuddin | G06N 20/00 |
| 2017/0322795 A1* | 11/2017 | DeMaris | H04L 67/10 |
| 2018/0089591 A1* | 3/2018 | Zeiler | G06F 8/00 |
| 2018/0129492 A1* | 5/2018 | Singh | G06N 3/006 |
| 2018/0189048 A1* | 7/2018 | Bala | G06F 8/656 |
| 2018/0189055 A1* | 7/2018 | Dasgupta | G06F 8/433 |

(Continued)

*Primary Examiner* — William D Titcomb

(57) ABSTRACT

In one aspect, a computerized method for implementing automated screen display generation and configuration including the step of obtaining a set of content that is displayed on a computer screen. The method includes the step of determining a number of screens to display the set of content. The method includes the step of determining an optimized location for each content in the number of screens that display the set of content using one or more machine learning methods to determine optimized location for each content in the number of screens.

1 Claim, 9 Drawing Sheets

(56) References Cited

U.S. PATENT DOCUMENTS

| | | | | |
|---|---|---|---|---|
| 2018/0341571 A1* | 11/2018 | Kislovskiy | ............... | G06F 8/65 |
| 2019/0108015 A1* | 4/2019 | Sridhara | ............ | G06Q 30/0282 |
| 2019/0129759 A1* | 5/2019 | Stevens | ............. | G06Q 10/0633 |
| 2019/0196952 A1* | 6/2019 | Manchiraju | ......... | G06F 11/3688 |
| 2019/0227980 A1* | 7/2019 | McMahan | ............ | G06N 3/0454 |
| 2019/0279159 A1* | 9/2019 | Cleaver | .................. | G06N 20/00 |
| 2019/0362841 A1* | 11/2019 | Aysin | ........................ | G06N 3/04 |
| 2020/0089487 A1* | 3/2020 | Ramic | ....................... | G06F 8/65 |
| 2020/0097301 A1* | 3/2020 | Pasala | ..................... | G06F 9/451 |

* cited by examiner

METHODS AND SYSTEMS FOR AUTOMATED SCREEN DISPLAY GENERATION AND CONFIGURATION

CLAIM OF PRIORITY

This application claims priority to U.S. Provisional Patent Application No. 62/767,152 filed on Nov. 14, 2018 and titled METHODS AND SYSTEMS FOR AUTOMATED SCREEN DISPLAY GENERATION AND CONFIGURATION. This application is hereby incorporated by reference in its entirety.

BACKGROUND

Software development in general is very inefficient with multiple people playing specialized roles (e.g. business analyst, systems analyst, architect, software engineer, QA engineer, dev ops engineer, and project manager, etc.), working together to develop and deliver software for large systems. However, gaps in communication between the roles can lead to inferior delivery of the software. Each role communicates with the next role through a series of artifacts like business requirement documents, test cases, architecture diagrams, etc. With the current state of the technology, it should be possible to eliminate inefficiencies in this process by having machines play a number of these roles and let the humans play the role of specification/requirement creators thereby making the process extremely efficient. Accordingly, there is a need to improve software development and maintenance to be more efficient.

SUMMARY OF THE INVENTION

In one aspect, a computerized method for implementing automated screen display generation and configuration including the step of obtaining a set of content that is displayed on a computer screen. The method includes the step of determining a number of screens to display the set of content. The method includes the step of determining an optimized location for each content in the number of screens that display the set of content using one or more machine learning methods to determine optimized location for each content in the number of screens.

Figure 1:
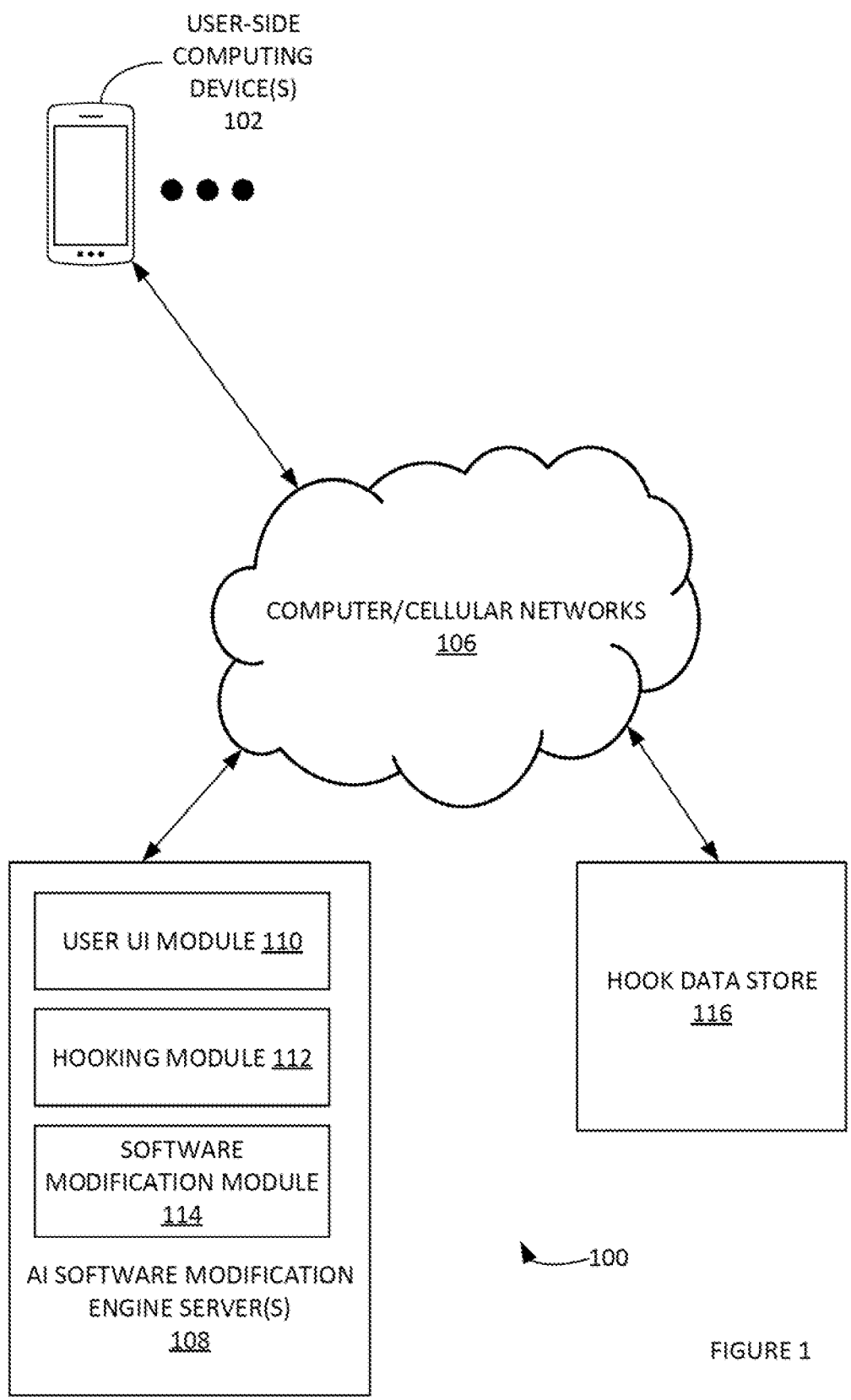
FIG. 1 illustrates an example system for automatically updating software functionality based on natural language input, according to some embodiments.

The Figures described above are a representative set and are not an exhaustive with respect to embodying the invention.

DESCRIPTION

Disclosed are a system, method, and article of automated screen display generation and configuration. The following description is presented to enable a person of ordinary skill in the art to make and use the various embodiments. Descriptions of specific devices, techniques, and applications are provided only as examples. Various modifications to the examples described herein can be readily apparent to those of ordinary skill in the art, and the general principles defined herein may be applied to other examples and applications without departing from the spirit and scope of the various embodiments.

Reference throughout this specification to "one embodiment," "an embodiment," 'one example,' or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art can recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, and they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Definitions

Example definitions for some embodiments are now provided.

Application programming interface (API) can specify how software components of various systems interact with each other.

Artificial neural networks (ANN) can be computing systems vaguely inspired by the biological neural networks that constitute animal brains. The ANN can be a framework for various different machine learning algorithms to work together and process complex data inputs. The ANN can learn to perform tasks by considering examples (e.g. without being programmed with any task-specific rules).

Bitmap is a mapping from some domain to bits. In one example a bitmap can include a map of pixels of a computer display/screen. A bitmap can also be as type of memory organization or image file format used to store digital images.

Cloud computing can involve deploying groups of remote servers and/or software networks that allow centralized data storage and online access to computer services or resources. These groups of remote serves and/or software networks can be a collection of remote computing services.

Decision tree is a decision support tool that uses a tree-like graph or model of decisions and their possible consequences, including chance event outcomes, resource costs, and utility. A decision tree can include conditional control statements.

Hooking can be a technique used to alter or augment the behavior of an operating system, applications, or of other software components by intercepting function calls or messages or events passed between software components. Code that handles such intercepted function calls, events or messages is called a hook.

Neural network can be a set of artificial neural networks, which are composed of artificial neurons or nodes that are used for solving artificial intelligence (AI) problems.

Support vector machines (SVMs) are supervised learning models with associated learning algorithms that analyze data used for classification and regression analysis.

TensorFlow is an open-source software library for dataflow programming across a range of tasks. It is a symbolic math library, and is also used for machine learning applications such as neural networks.

Exemplary Systems

FIG. 1 illustrates an example system 100 for automatically updating software functionality based on natural language input, according to some embodiments.

The user-side computing device(s) 102 can include/access an AI software modification application. AI software modification application can be accessed via an application (e.g. via a widget, web page, mobile-application page, etc.). AI software modification application can be used to implement modifications to software module functionalities via natural language input. Accordingly, AI software modification application can provide functionalities for a user to input voice, text, graphical inputs, etc. Said inputs indicate user preferences for updates to specified functionalities. As noted, AI software modification engine server(s) 106 can then automatically determine specific updates to software modules that will implement the user inputs. For example, AI software modification engine server(s) 106 can select one hook to integrate into specified hook anchors in the code of the software modules. AI software modification engine server(s) 106 can integrate the hooks into the software modules via the hook anchors. AI software modification engine server(s) 106 can manage the modifications to the code of the software modules using the hooks. AI software modification engine server(s) 106 can then de-integrate the hook(s) from the software module. AI software modification engine server(s) 106 can present a test version of the updated software functions to the user for testing and/or review purposes.

Computer/Cellular networks 106 can include the Internet, text messaging networks (e.g. short messaging service (SMS) networks, multimedia messaging service (MMS) networks, proprietary messaging networks, instant messaging service networks, email systems, etc. Computer/Cellular networks 106 can include cellular networks, satellite networks, etc. Computer/Cellular networks 106 can be used to communicate messages and/or other information (e.g. videos, tests, articles, digital images, videos, other educational materials, etc.) from the various entities of system 100.

As noted supra, AI software modification engine server(s) 106 can include modules for updating software code based on natural language input from a user. Example users an include non-software programmers in an enterprise such as, inter alia: business analysts, corporate officers, project managers, etc.

AI software modification engine server(s) 108 can include hooking module 112. Hooking module 112 can attach hooks prior to the application being started and/or while inserted while software is already running.

Hooks can be attached to software modules at specified hook anchor based on a preset identifier provided in the software module and/or hook anchor. A hook can intercept function calls to either monitor or replace them entirely. For example, by using a disassembler, the entry point of a function within a module can be found. It can then be altered to instead dynamically load some other library module and then have it execute desired methods within that loaded library. If applicable, another related approach by which hooking can be achieved is by altering the import table of an executable. This table can be modified to load any additional library modules as well as changing what external code is invoked when a function is called by the application.

A hook anchor can be a prespecified location in a software module for integrating a hook. Hook anchors can have preset identifiers. These identifiers can identify the software module, the functionalities of the software module, the types of hooks accepted by the hook anchor, permissions for the types of users that can make updates to the software module, time parameter restrictions, etc.

In some examples, an administrator entity can manually assist in identifying hooks and/or software updates. The administrator can also select specific hooks and/or generate new hooks based on the user request. For example, if a hook related to a user request does not exist, the administrator can generate the hook and identify a software module for the hook. The administrator can place a hook anchor in the software module as well. In other examples, the hooking module 112 can automatically perform these tasks in an algorithmic manner based on, inter alia, on: the content of the user request, user permissions, software module content, and the like.

An alternative method for achieving function hooking is by intercepting function calls through a wrapper library. When creating a wrapper, you make your own version of a library that an application loads, with all the same functionality of the original library that it will replace. That is, all the functions that are accessible are essentially the same between the original and the replacement. This wrapper library can be designed to call any of the functionality from the original library, or replace it with an entirely new set of logic.

Operating systems and software may provide the means to easily insert event hooks at runtime. It is available provided that the process inserting the hook is granted enough permission to do so. Idea of an admin that can manually assist user AI software modification engine server(s) 108 can include various other functionalities such as, inter alia: web servers, SMS servers, IM servers, chat bots, database system managers, e-commerce engines, etc. AI software modification engine server(s) 106 can include manage a mobile-device application in both user-side computing device(s) 102.

AI software modification engine server(s) 108 can manage a chat-bot service. Chat-bot service can provide various interactive services via specified instant messaging platforms. The chat-bot can include a virtual programming assistant for a user. AI software modification engine server(s) 108 can utilize chatbots to interact with user to, inter alia: answer basic questions about software module functionality preferences; schedule software module upgrades; implement software module modifications; etc. It is noted that modules 110-114 can query the user via a chat bot. In this way, the user can update preferences, review test models, etc. via a chat bot/personal programming assistant interface.

AI software modification engine server(s) 108 can include a user interface 110 module. User interface 110 module can interpret user inputs regarding updates to software code system. User interface 110 module can provide a user interface for a user to input commands in the user-side computing device 102. User interface 110 module can include speech to text engine. Speech to text engine can recognize and translate the spoken language of user into computer-readable text. Speech to text engine can use various automatic speech recognition (ASR) algorithms. User interface 110 module can manage permissions for users (e.g. passwords, etc.). In one example, User interface 110 module can recognize the voices of users and use the voice recognition to determine which software modules the user has permission to modify with which preferences.

Speech to text engine can listen to conversations between a plurality of users. Speech to text engine can translate the conversation to a machine-readable format. AI software modification engine server(s) 106 can then translate the user conversation into a set of user intentions to automatically updating software functionality based on natural language input as provided herein. AI software modification engine server(s) 106 can use machine-learning techniques to train itself to improve natural language programming techniques. For example, AI software modification engine server(s) 106 can study and construct of algorithms that can learn from and make predictions on data. AI software modification engine server(s) 106 can provide a prediction model that initially fit on a training dataset, that is a set of examples used to fit the parameters (e.g. weights of connections between neurons in artificial neural networks) of the model. The model (e.g. a neural net or a naive Bayes classifier) is trained on the training dataset using a supervised learning method (e.g. gradient descent or stochastic gradient descent). The training dataset often consist of pairs of an input vector (e.g. user natural language programming input) and the corresponding answer vector or scalar (e.g. a corresponding programming action) as a target. The current model is run with the training dataset and produces a result, which is then compared with the target, for each input vector in the training dataset. Based on the result of the comparison and the specific learning algorithm being used, the parameters of the model are adjusted. The model fitting can include both variable selection and parameter estimation. Successively, the fitted model is used to predict the responses for the observations in a second dataset called the validation dataset. The validation dataset provides an unbiased evaluation of a model fit on the training dataset while tuning the model's hyperparameters. Users involved in the conversation can be queried for verifications and their responses can be used to improve the machine learning process as well.

AI software modification engine server(s) 106 can enable collaborative natural-language programming sessions that involve a plurality of users. Based on a pre-defined user-hierarchy (e.g. enterprise job title, etc.), AI software modification engine server(s) 106 can prioritize user inputs and make corresponding software updates. AI software modification engine server(s) 106 can query users and/or otherwise inform users that a conflict of input has been detected in the conversation. Users can then clarify an input to prioritize.

AI software modification engine server(s) 106 can provide live sand-box version of the software application/functionality being modified. In this way, a user can test a current version of a software functionality/application being modified before committing it. A user can determine the impact of change on mode of operation. AI software modification engine server(s) 106 can provide a list of possible impacts (e.g. can run simulations, perform automated impact analysis, etc.). AI software modification engine server(s) 106 can implement changes to a specified set of versions of the software application/functionality being modified. For example, AI software modification engine server(s) 106 can update/generate a Web-based version, an Android® application version, an Apple iPhone® version, etc. based on user selections. AI software modification engine server(s) 106 can build a self-documenting module that provide natural-language documentation. This can be used for training materials. The documentation can be included/located in the same areas as the binary codes as user-readable natural-language comments. This can be used to explain parts of code and translate metadata back to human-readable documentation.

AI software modification engine server(s) 106 can include a text-to-speech functionality. This can enable the AI software modification engine server(s) 106 to communicate with users in a relevant natural-language in a spoken form (and/or text forms via a user interface, text messages, emails, etc.). This functionality can be leveraged to provide natural-language descriptions of all or portions of the software functionality/application being examined/modified/created. Users can designate a user programming expertise level and the AI software modification engine server(s) 106 can set a level of jargon, detail and technical expertise to provide information to the user at.

In this way, AI software modification engine server(s) 106 can implement software programming through conversations and generic programming statements (e.g. 'iterate until a specified condition'; 'repeat a hundred times'; 'for every employee, generate a questionnaire about their satisfactions with these ten questions'; etc.). The AI software modification engine server(s) 106 can query back with text to voice that generates human understandable follow up questions. AI software modification engine server(s) 106 can direct a conversation with the user that drills down into an industry topic to obtain relevance. For example, AI software modification engine server(s) 106 can verify the domain-specific definition of a term/key word (e.g. group in a health plan, group in an educational domain, etc.) In this way, the AI software modification engine server(s) 106 can be adapted to multiple verticals (e.g. health care, education, insurance, banking, etc.). For example, AI software modification engine server(s) 106 can determine if the key word 'plan' is a retirement plan, an insurance plan, a healthcare plan, etc. AI software modification engine server(s) 106 can perform term recognition based on the known current domain. AI software modification engine server(s) 106 can use a taxonomy of key words for each domain and determine the current domain and then the appropriate key word and its definition.

User interface 110 module can use machine learning algorithms, ranking engines, search engines and the like to determine a user's intent. User interface 110 module can present the interpreted intent to the user for verification. User intent or query intent is the identification and categorization of what a user online intended or wanted when they typed their search terms into an online web search engine for the purpose of search engine optimization or conversion rate optimization. User interface 110 module can use various ways of classifying or naming the categories of the different types of user intent. These can include clustering algorithms and the like (e.g. informational, transactional, and navigational methods).

AI software modification engine server(s) 106 can include one or more ranking and sorting functionalities AI software modification engine server(s) 106 can rank hook and/or software module query results. For example, given a query for a hook and/or software module, AI software modification engine server(s) 106 can determine and a collection of hooks and/or software modules that match the query, AI software modification engine server(s) 106 can rank/sort the documents according to a set of specified criteria so that the best results appear early in the result list displayed to the user. Ranking can be reduced to the computation of numeric scores on query/document pairs; a baseline score function for this purpose is the cosine similarity between tf-idf vectors representing the query and the document in a vector space model, BM25 scores, or probabilities in a probabilistic IR model. AI software modification engine server(s) 106 can implement a sorting algorithm on hook and/or software module results based on which ones best match the user's programming intention. AI software modification engine server(s) 106 can maintain an indexing system. The indexing system can include user uploaded tags, annotations, metadata, etc. associated with hooks and/or software modules to be searched.

Software modification module 114 can use hooks inserted into a software module to update the code of said software module. In this way, software modification module 114 can modify the functionality of the software module. For example, the software module can be the hypertext markup language of a webpage. Software modification module 114 can use a hook inserted into the webpage document to update the portion of the hypertext markup language of a webpage can controls the background color of the webpage.

AI software modification engine server(s) 106 can utilize machine learning techniques (e.g. artificial neural networks, etc.). Machine learning is a type of artificial intelligence (AI) that provides computers with the ability to learn without being explicitly programmed. Machine learning focuses on the development of computer programs that can teach themselves to grow and change when exposed to new data. Example machine learning techniques that can be used herein include, inter alia: decision tree learning, association rule learning, artificial neural networks, inductive logic programming, support vector machines, clustering, Bayesian networks, reinforcement learning, representation learning, similarity and metric learning, and/or sparse dictionary learning.

AI software modification engine server(s) 108 can obtain one or more conversations between a group of users. AI software modification engine server(s) 108 determine the subject matter of the conversation.

Figure 2:
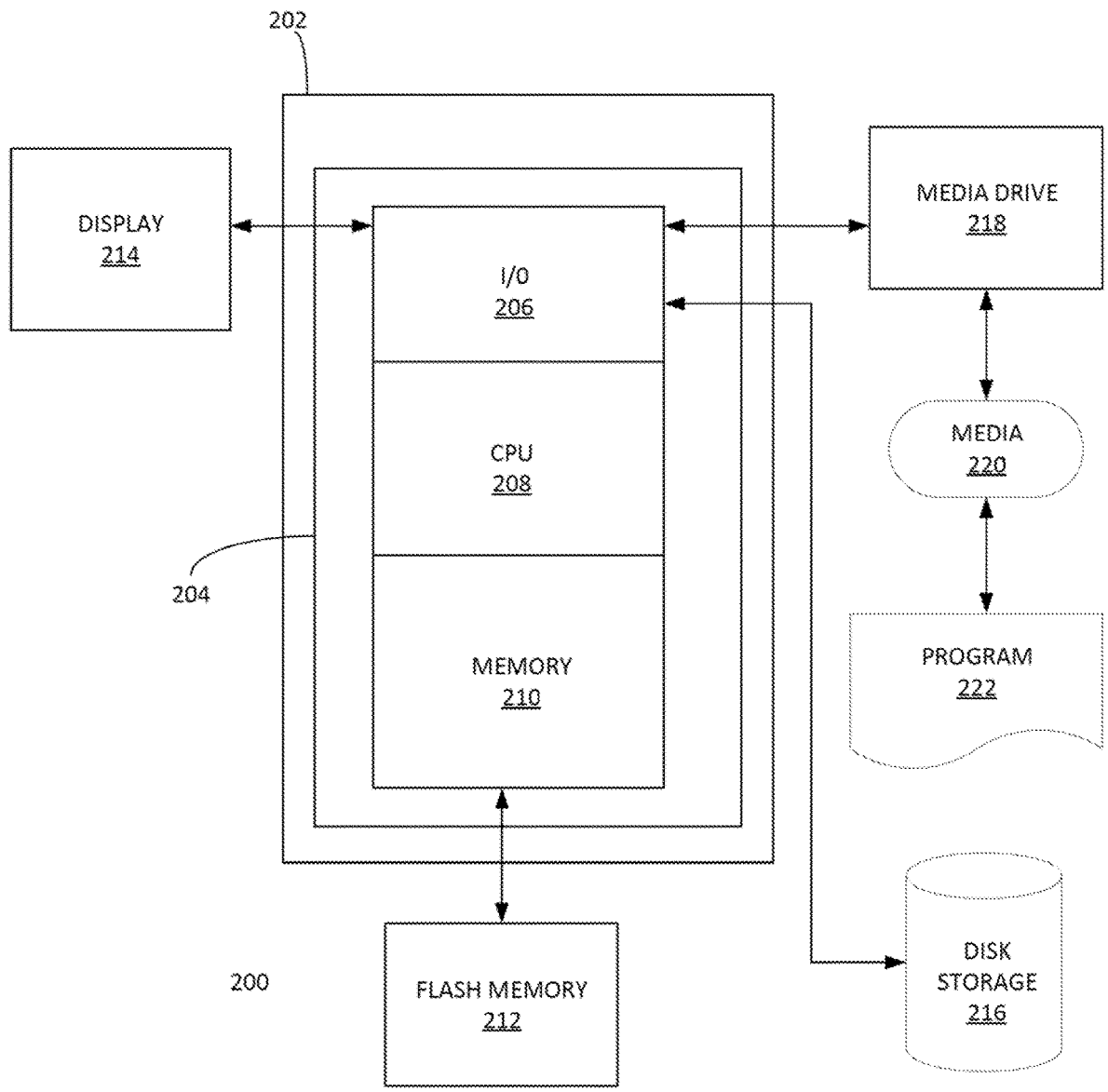
FIG. 2 depicts an exemplary computing system that can be configured to perform any one of the processes provided herein.

FIG. 2 depicts an exemplary computing system 200 that can be configured to perform any one of the processes provided herein. In this context, computing system 200 may include, for example, a processor, memory, storage, and I/O devices (e.g., monitor, keyboard, disk drive, Internet connection, etc.). However, computing system 200 may include circuitry or other specialized hardware for carrying out some or all aspects of the processes. In some operational settings, computing system 200 may be configured as a system that includes one or more units, each of which is configured to carry out some aspects of the processes either in software, hardware, or some combination thereof.

FIG. 2 depicts computing system 200 with a number of components that may be used to perform any of the processes described herein. The main system 202 includes a motherboard 204 having an I/O section 206, one or more central processing units (CPU) 208, and a memory section 210, which may have a flash memory card 212 related to it. The I/O section 206 can be connected to a display 214, a keyboard and/or other user input (not shown), a disk storage unit 216, and a media drive unit 218. The media drive unit 218 can read/write a computer-readable medium 220, which can contain programs 222 and/or data. Computing system 200 can include a web browser. Moreover, it is noted that computing system 200 can be configured to include additional systems in order to fulfill various functionalities. Computing system 200 can communicate with other computing devices based on various computer communication protocols such a Wi-Fi, Bluetooth® (and/or other standards for exchanging data over short distances includes those using short-wavelength radio transmissions), USB, Ethernet, cellular, an ultrasonic local area communication protocol, etc.

Figure 3:
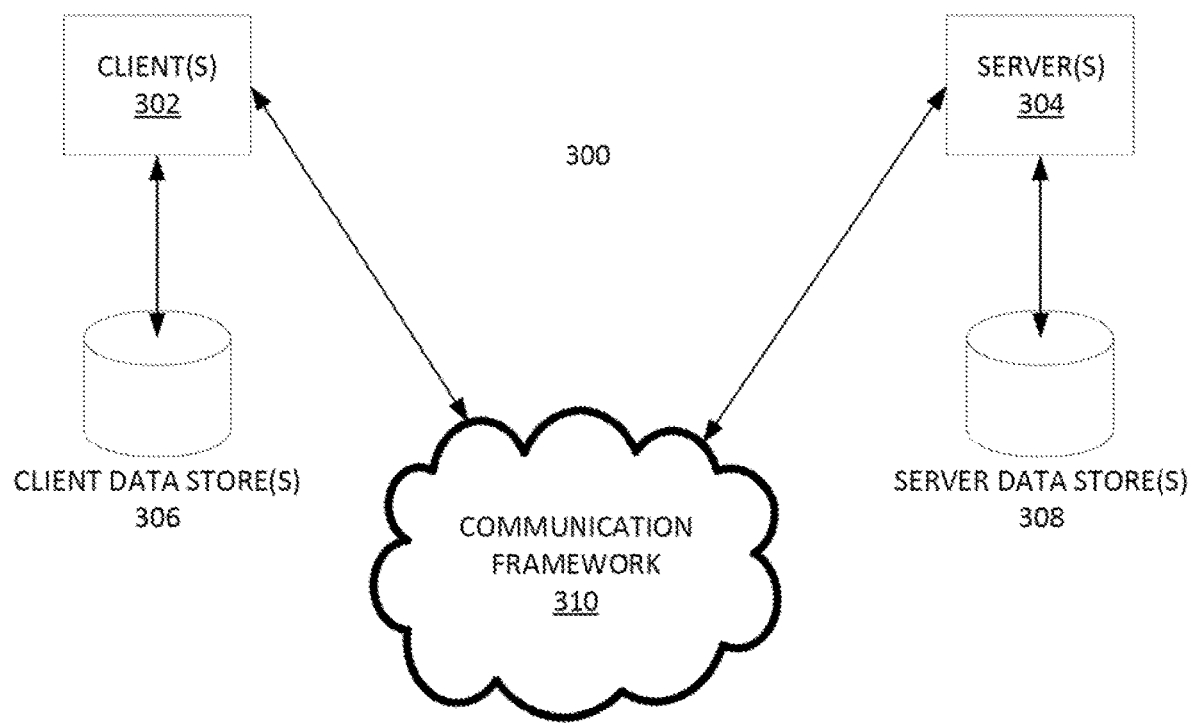
FIG. 3 is a block diagram of a sample computing environment that can be utilized to implement various embodiments.

FIG. 3 is a block diagram of a sample computing environment 300 that can be utilized to implement various embodiments. The system 300 further illustrates a system that includes one or more client(s) 302. The client(s) 302 can be hardware and/or software (e.g., threads, processes, computing devices). The system 300 also includes one or more server(s) 304. The server(s) 304 can also be hardware and/or software (e.g., threads, processes, computing devices). One possible communication between a client 302 and a server 304 may be in the form of a data packet adapted to be transmitted between two or more computer processes. The system 300 includes a communication framework 310 that can be employed to facilitate communications between the client(s) 302 and the server(s) 304. The client(s) 302 are connected to one or more client data store(s) 306 that can be employed to store information local to the client(s) 302. Similarly, the server(s) 304 are connected to one or more server data store(s) 308 that can be employed to store information local to the server(s) 304. In some embodiments, system 300 can instead be a collection of remote computing services constituting a cloud-computing platform.

Exemplary Methods

The following methods/processes can be implemented by systems 100-300.

Figure 4:
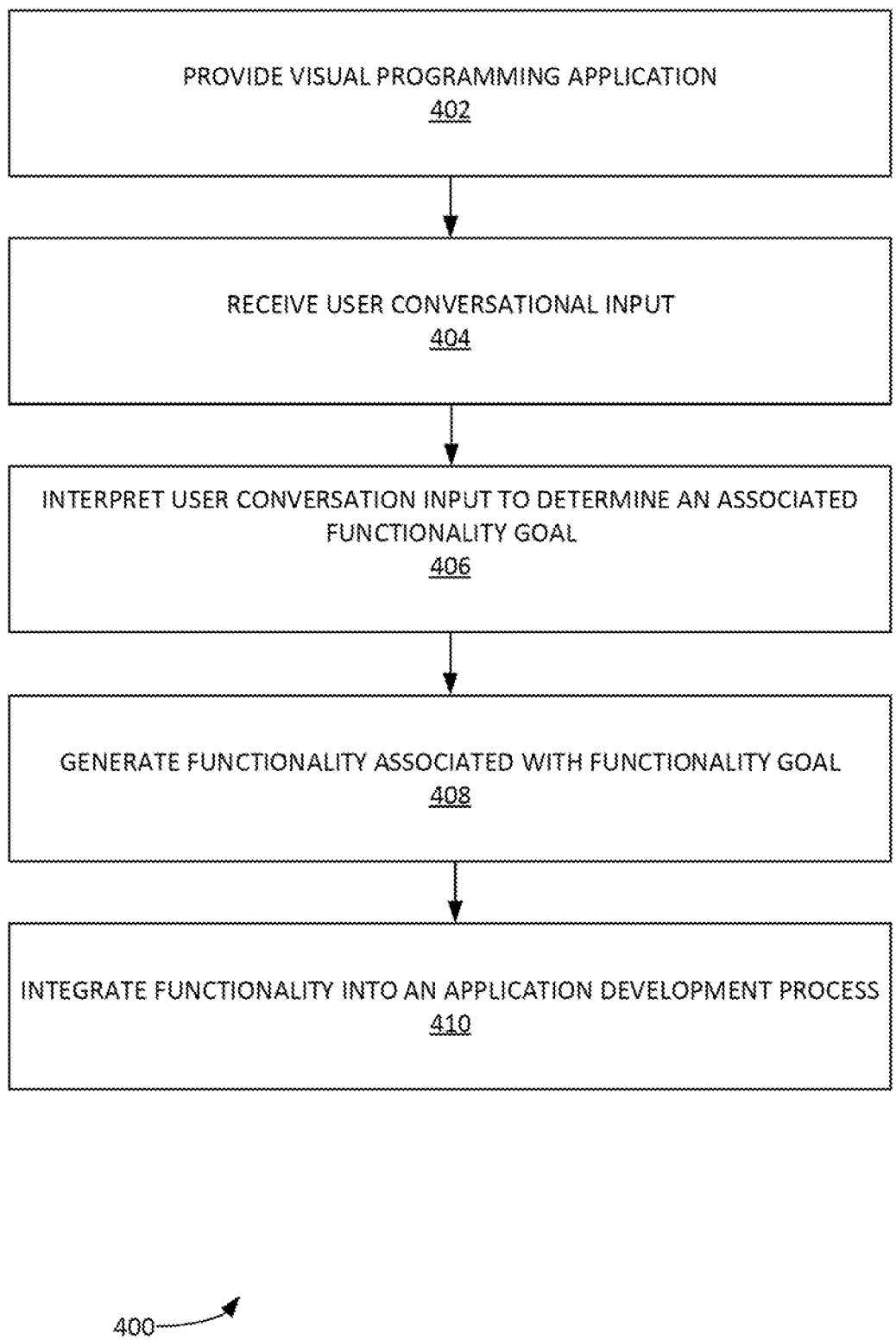
FIG. 4 illustrates an example process for implementing automatically updating software functionality with NLP input from a user, according to some embodiments.

FIG. 4 illustrates an example process 400 for implementing automatically updating software functionality with NLP input from a user, according to some embodiments. In step 402, process 400 can provide visual programming application. In step 404, process 400 can receive user conversational input. In step 406, process 400 can interpret user conversation input to determine an associated functionality goal. In step 408, process 400 can generate functionality associated with functionality goal. In step 410, process 400 can integrate functionality into an application development process.

Figure 5:
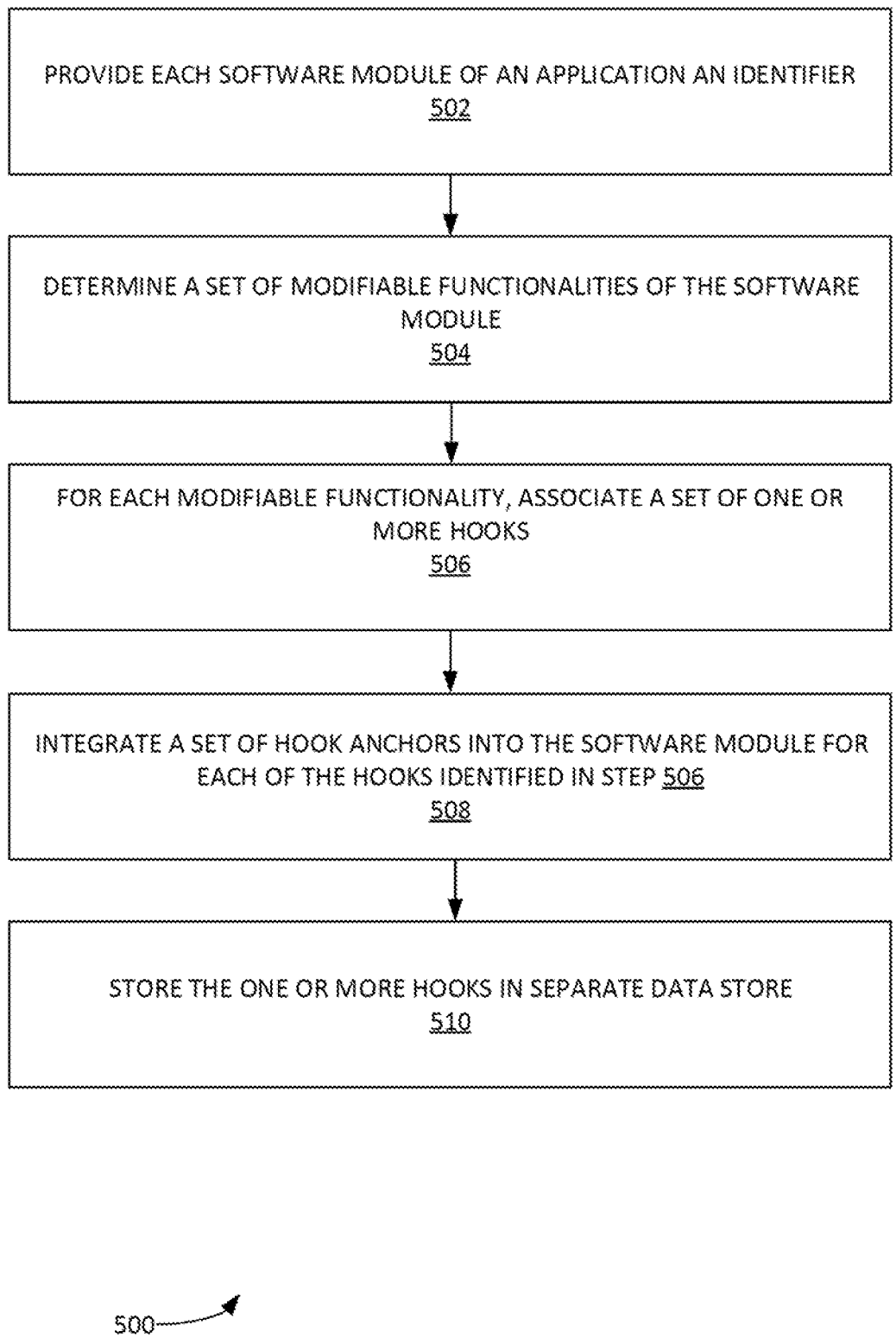
FIG. 5 illustrates an example process of identifying and integrating hook anchors into a software module, according to some embodiments.

FIG. 5 illustrates an example process of identifying and integrating hook anchors into a software module, according to some embodiments. In step 502, process 500 can provide each software module of an application an identifier. In step 504, process 500 can determine a set of modifiable functionalities of the software module. In step 506, process 500 can, for each modifiable functionality, associate a set of one or more hooks. In step 508, process 500 can integrate a set of hook anchors into the software module for each of the hooks identified in step 506. In step 510, process 500 can store the one or more hooks in separate data store.

Figure 6:
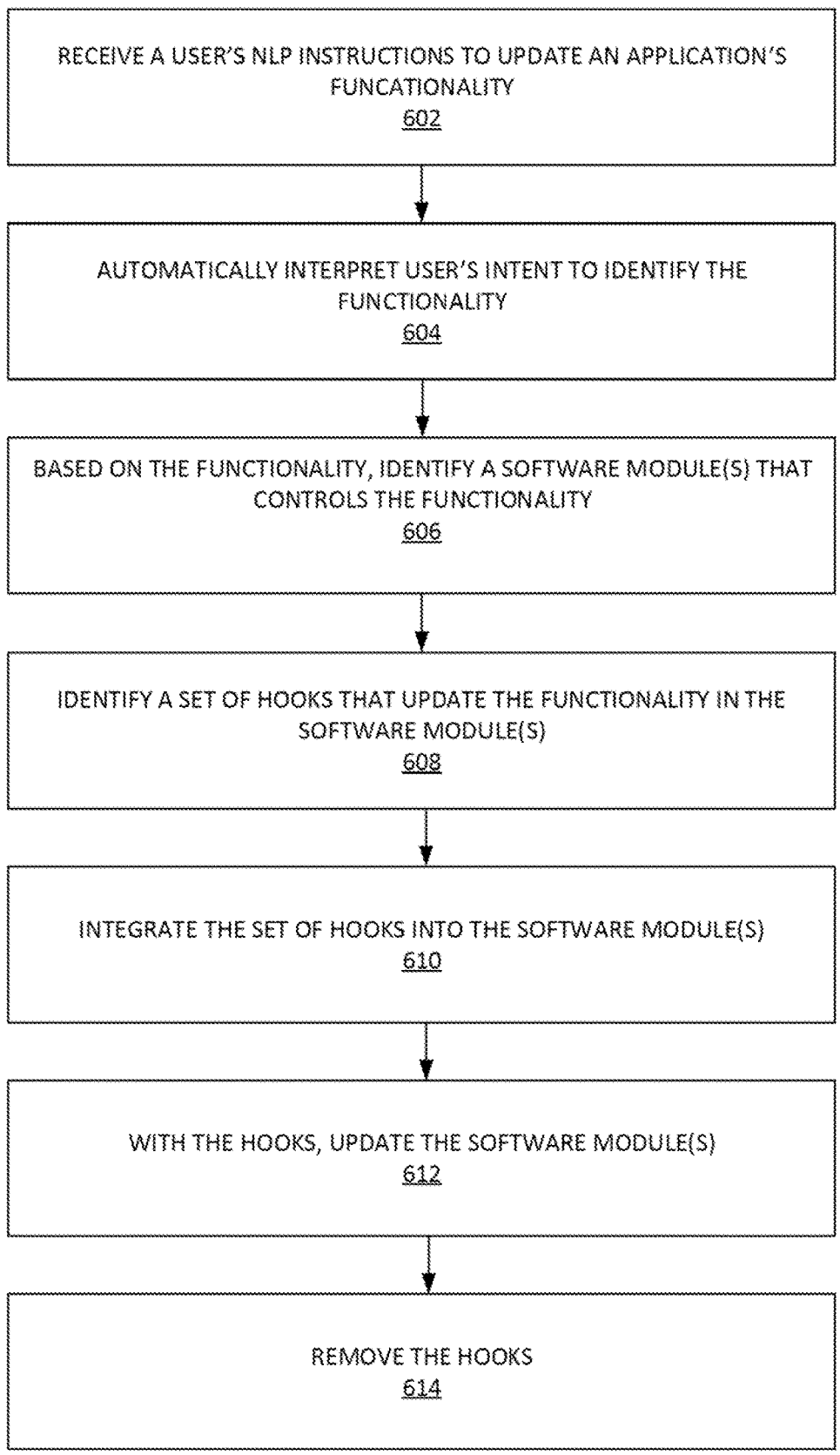
FIG. 6 illustrates an example process of updating a software module's functionality with temporary hooks, according to some embodiments.

FIG. 6 illustrates an example process of updating a software module's functionality with temporary hooks, according to some embodiments. In step 602, process 600 can receive a user's NLP instructions to update an application's functionality. In step 604, process 600 can automatically interpret user's intent to identify the functionality. In step 606, process 600 can based on the functionality, identify a software module(s) that controls the functionality. In step 608, process 600 can identify a set of hooks that update the functionality in the software module(s). In step 610, process 600 can integrate the set of hooks into the software module(s). with the hooks, update the software module(s). In step 612, process 600 can remove the hooks.

Additional Methods

Figure 7:
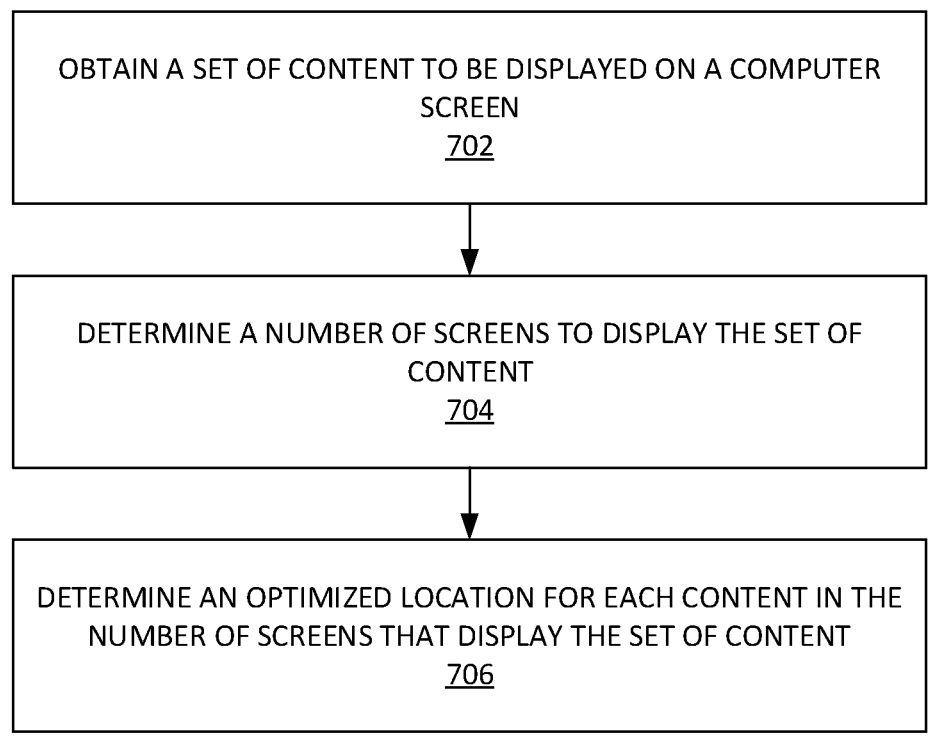
FIG. 7 illustrates an example process for implementing automated screen display generation and configuration, according to some embodiments.

FIG. 7 illustrates an example process 700 for implementing automated screen display generation and configuration, according to some embodiments. In step 702, process 700 can obtain a set of content to be displayed on a computer screen. Content can be any displayable graphical display element with a graphical user interface. Content can include text, digital images, digital videos, user input boxes, other graphical interaction elements (e.g. scroll bars, buttons, etc.), etc.

In step 704, process 700 can determine a number of screens to display the set of content. In one example, a single screen can be used to display the set of content. However, in other examples, a series of screens can be used. The series of screen can follow tree structure (e.g. a decision tree) with each screen modeled as a node. The tree structure can depend on user input/interactions in previous screen. According it is noted that process 700 (and/or processes provided infra in support of process 700) can be repeatedly run in order to automatically generate/configure subsequent display screen content and content placement based on previous user input/interaction performed in previous screens.

In one example, each screen can be associated with layer of an intake process for a client in a client on-boarding application. Thus, a subset of screens can be associated with layer of intake process (e.g. an application action).

In step 706, process 700 can determine an optimized location for each content in the number of screens that display the set of content. Process 700 can use machine learning methods to determine the optimal location/placement of the content in the number of screens. It is noted that specified content can be placed repeatedly on a single screen and/or a series of screens. It is noted that step 706 can also be used for selecting a how to visually group content elements and how-to color/size/shape said content elements as wells.

In one example, process 700 can use prior understandings of a user's decision-making process to optimize the content selection and placement. The decision-making process can involve a user's cognitive process resulting in the selection of a belief or a course of action among several alternative possibilities. A decision-making process produce a final choice, which may or may not prompt action. The content selection and placement can be selected to include this information.

In another example, process 700 can take into account eye-tracking studies and/or other information that provides optimized content placement location information. For example, an eye-tracking study can provide information as to the optimal placement of a search bar or a digital image.

Machine-learning algorithms can be used to determine optimization(s). Process 700 can use training data sets obtained from various sources. An ANN can be used. Example ANNs can include, inter alia: group method of data handling, convoluation neural networks; long short-term memory systems; deep reservoir computing; deep belief networks; large memory storage and retrieval neural networks; stacked (de-noising) auto-encoders; deep stacking networks; tensor deep stacking networks; spike-and-slab RMBS; compound hierarchical-deep models; deep predictive coding networks; networks with separate memory structures; LSTM-related differentiable memory structures; neural Turing machines; semantic hashing; memory networks; pointer networks; encoder-decoder networks; multilayer kernel machines; etc. It is noted that ANN methods can be combined with other processes provided herein in various example embodiments.

In some examples, an SVM can be used. Given a set of training examples, each training examples can be marked as belonging to one or the other of two categories and an SVM training algorithm can then build a model that assigns content examples to one category or the other (e.g. to a specified screen in a series of screens, to a specified location on one or more screens, color and other display attributes, etc.). The SVM can be a non-probabilistic binary linear classifier (although it is noted that in other example methods the SVM can be used in a probabilistic classification setting (e.g. with Platt scaling, etc.)). The SVM model can also include a representation of the examples as points in a space, mapped so that the examples of the separate categories are divided by a clear gap that is as wide as possible. New examples are then mapped into that same space and predicted to belong to a category based on which side of the gap they fall. In addition to performing linear classification, the SVMs can perform a non-linear classification (e.g. using a kernel trick, etc.), implicitly mapping their inputs into high-dimensional feature spaces. The content data/screen data/display element graphical attributes can be labelled for supervised learning. When the data is note labelled an unsupervised learning approach can be utilized. The unsupervised methods can use natural clustering of the content data/screen data/display element graphical attributes to groups, and then map new data to these formed groups. Example support vector clustering algorithm(s) can also apply the statistics of support vectors to categorize unlabeled data. It is noted that SVM methods can be combined with other processes provided herein in various example embodiments.

Figure 8:
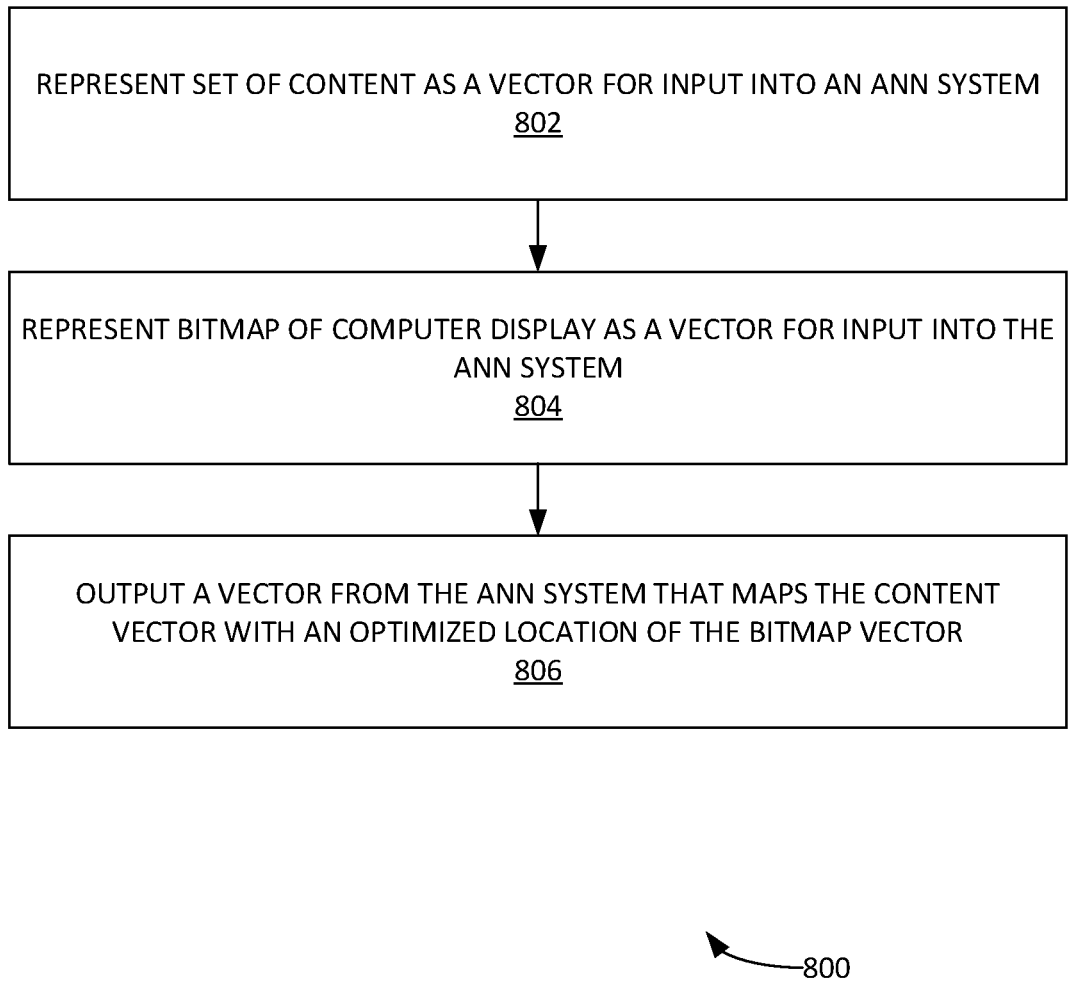
FIG. 8 illustrates an example process for using ANN for outputting a vector used for automated screen display generation and configuration, according to some embodiments.

FIG. 8 illustrates an example process 800 for using ANN for outputting a vector used for automated screen display generation and configuration, according to some embodiments. In step 802 process 800 can represent set of content as a vector for input into an ANN system. In step 804, process 800 can then represent bitmap of computer display as a vector for input into the ANN system. These two vectors can be processed by the ANN system. Accordingly, in step 806, process 800 can output a vector from the ANN system that maps the content vector with an optimized location of the bitmap vector. Process 800 can train with a set of historical versions of the two vectors as input. Process 800 can translate the content data elements into a series of vectors (e.g. the output of process 806. In this way, process 800 generates a vector trained by a neural model(s).

Figure 9:
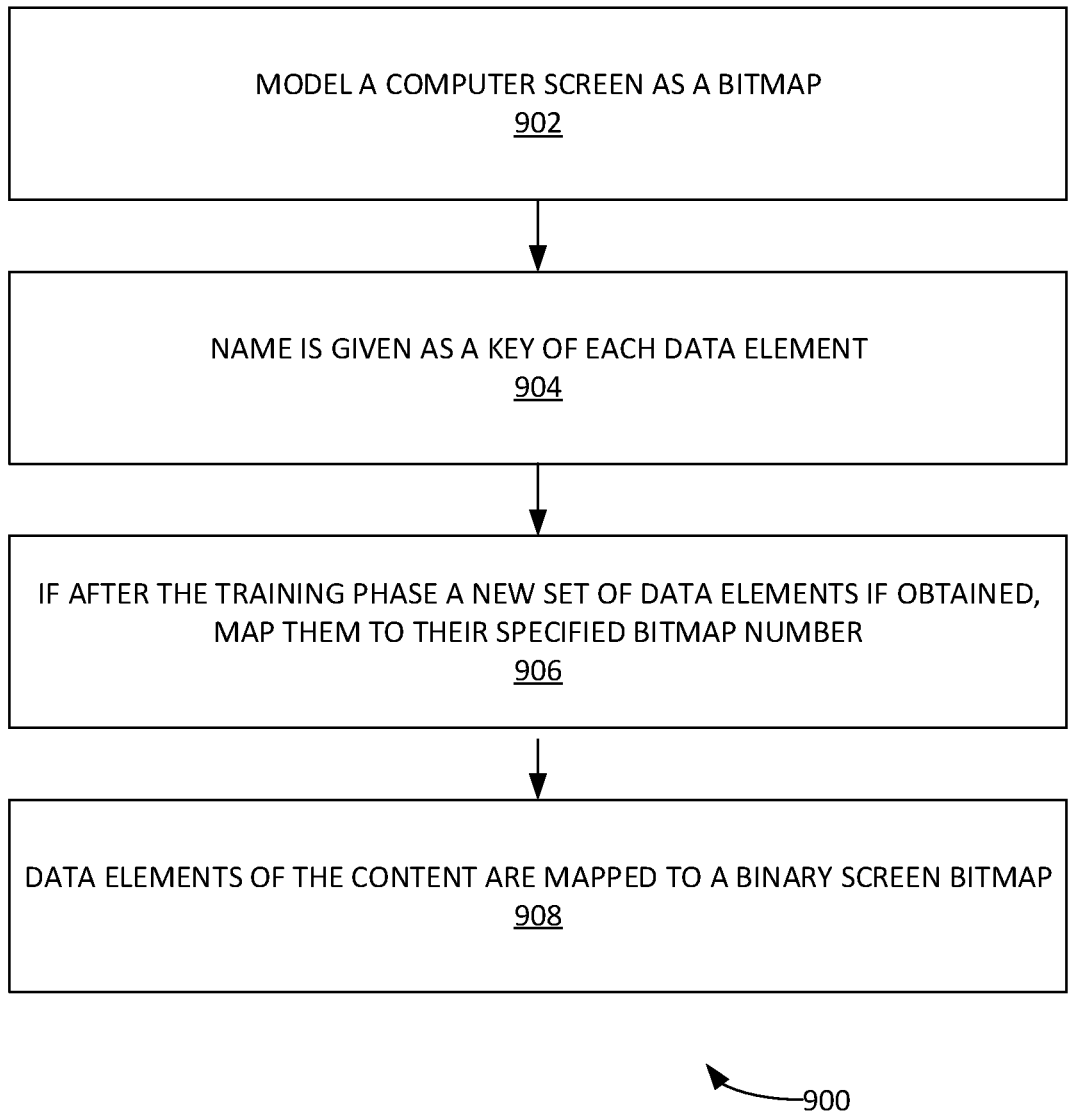
FIG. 9 illustrates another process for training a neural network system, according to some embodiments.

FIG. 9 illustrates another process 900 for training a neural network system, according to some embodiments. In step 902, process 900 can model a computer screen as a bitmap. In step 904, a name is given as a key of each data element. Each data element is given a key and a bit map placement.

In step 906, process 900 trains with various permutations of data element placements (e.g. based on a set of examples). In step 908, if after the training phase a new set of data elements if obtained, process 900 can map them to their specified bitmap number and then place according to results of the ML training of process 900. In step 908, the data elements of the content are mapped to a binary screen bitmap. The data elements are located on the computer screen in terms of the bitmap.

Process 900 can use neural models for training. Tensorflow can be used for the training process. Process 900 can provide how information is grouped together as well. For example, process 900 can group subsets of data elements. Process 900 can determine how the subsets of data element of content are colored, sized, lined, shaded, etc. Process 900 can train model with multiple bit maps. Process 900 can provide ranked lists of data element attributes and locations based on the ML training output. Process 900 can leverage recommendations engines and processes as well. It is noted that processes 700-900 can be used to generate and mange the content of web pages, mobile device application pages, and the like.

Conclusion

Although the present embodiments have been described with reference to specific example embodiments, various modifications and changes can be made to these embodiments without departing from the broader spirit and scope of the various embodiments. For example, the various devices, modules, etc. described herein can be enabled and operated using hardware circuitry, firmware, software or any combination of hardware, firmware, and software (e.g., embodied in a machine-readable medium).

In addition, it can be appreciated that the various operations, processes, and methods disclosed herein can be embodied in a machine-readable medium and/or a machine accessible medium compatible with a data processing system (e.g., a computer system), and can be performed in any order (e.g., including using means for achieving the various operations). Accordingly, the specification and drawings are to be regarded in an illustrative rather than a restrictive sense. In some embodiments, the machine-readable medium can be a non-transitory form of machine-readable medium.

The invention claimed is:

1. A computerized method for implementing automatically updating software functionality with natural language programming (NLP) input from a user comprising:
providing visual programming application;
receiving a user conversational input;
converting the user conversation input into a machine-readable format;
interpreting the user conversation input to determine an associated functionality goal of the user conversation input;
generating a functionality associated with functionality goal;
integrating the functionality into an application development process;
wherein the functionality of the application development process comprises a functionality for implementing automated screen display generation and configuration, and
wherein a chatbot system is used to receive a user conversational input,
using the functionality for implementing automated screen display generation and configuration to:
obtain a set of content that is displayed on a computer screen;
determine a number of screens to display the set of content; and
determine an optimized location for each content in the number of screens that display the set of content using one or more machine learning methods to determine optimized location for each content in the number of screens;
wherein the content comprises a displayable graphical display element with a graphical user interface wherein the content comprises a text, a digital image, a digital video or a user input box wherein a single screen is used to display the set of content,
wherein the series of screen follows a decision tree structure with each screen modeled as a node,
wherein each screen is associated with a layer of an intake process for a client in a client on-boarding application,
wherein the content is placed repeatedly on a series of screens,
wherein the one or more machine learning methods to determine are used to select a visually grouping of content elements and to select a color of said content elements,
using an artificial neural network (ANN) system for outputting a vector used for an automated screen display generation and configuration;
representing a set of content as a vector for input into the ANN system;
representing a bitmap of computer display as a vector for input into the ANN system, wherein the two vectors are processed by the ANN system;
outputting a vector from the ANN system that maps the content vector with an optimized location of the bitmap vector;
training the ANN system with a set of historical versions of the two vectors as input;
translating the content data elements into a series of vectors;
generating a vector trained by the ANN system, wherein the vector is used for automated screen display generation and configuration;
training the ANN system to model a computer screen as a bitmap, wherein a name is given as a key of each data element, wherein each data element is given a key and a bit map placement;
after the training phase, obtaining a new set of data elements;
mapping the new set of data elements to a specified bitmap number; and placing the new set of data element according to the mapping, wherein the new set of data elements of the content are mapped to a binary screen bitmap, wherein the new set of data elements are located on the computer screen in terms of the bitmap.

* * * * *